United States Patent
Takasu

(10) Patent No.: US 6,580,190 B2
(45) Date of Patent: Jun. 17, 2003

(54) CIRCUMFERENTIAL CONFRONTING TYPE MOTOR

(75) Inventor: Yoshimi Takasu, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/213,267

(22) Filed: Aug. 5, 2002

(65) Prior Publication Data

US 2003/0025413 A1 Feb. 6, 2003

(30) Foreign Application Priority Data

Aug. 6, 2001 (JP) ........................................ 2001-238489

(51) Int. Cl.[7] ............................................... H02K 23/04
(52) U.S. Cl. ............................... 310/154.28; 310/67 R; 310/156.43; 310/156.45; 310/156.82; 310/295; 310/261; 310/90
(58) Field of Search ......................... 310/154.28, 67 R, 310/156.01, 156.04, 156.05, 156.43, 156.45, 156.44, 156.82, 258, 259, 265, 267, 261, 90, 90.5

(56) References Cited

U.S. PATENT DOCUMENTS

| | | | | |
|---|---|---|---|---|
| 4,302,692 A | * | 11/1981 | Matsumoto et al. | ........ 310/113 |
| 4,383,193 A | * | 5/1983 | Tomite et al. | ......... 310/154.26 |
| 4,574,211 A | * | 3/1986 | Muller et al. | ............. 310/68 R |
| 4,818,907 A | * | 4/1989 | Shirotori | .................... 310/67 R |
| 5,134,331 A | * | 7/1992 | Miyaji et al. | .................. 310/90 |
| 5,220,227 A | * | 6/1993 | Ohi | ........................ 310/156.43 |
| 5,847,483 A | * | 12/1998 | Suzuki et al. | .......... 310/156.45 |
| 6,133,655 A | * | 10/2000 | Suzuki et al. | .................. 310/51 |

* cited by examiner

Primary Examiner—Thanh Lam
(74) Attorney, Agent, or Firm—Hogan & Hartson, LLP

(57) ABSTRACT

A circumferential confronting type motor includes an armature core that has drive coils wound around its plurality of poles, and a drive magnet positioned opposite to the armature core in the radial direction. The drive magnet has a plurality of divided magnetized sections, each with a magnetic center, formed separated from each other in the axial direction by a non-magnetized section. The magnetic centers of the respective plurality of divided magnetized sections are provided in symmetrical positions with respect to a magnetic center in the axial direction of the armature core. Further, electromagnetic action between the drive magnet and the armature core causes the two to rotate relatively, while magnetic action between the plurality of divided magnetized sections and the armature core regulates their relative movements in the axial direction.

20 Claims, 6 Drawing Sheets

CIRCUMFERENTIAL CONFRONTING TYPE MOTOR

BACKGROUND OF THE INVENTION

1. Field of the Invention

The present invention relates to a circumferential confronting type motor, in which an armature core and a drive magnet are positioned opposite each other in the radial direction. More specifically, it relates to a thrust bearing mechanism that relatively regulates through magnetic action the movement in the axial direction of a rotor assembly and a stator assembly of the circumferential confronting type motor.

2. Description of Related Art

A variety of motors have been proposed that employ a thrust magnetic bearing mechanism in order to stabilize support in the thrust direction of a rotor assembly in a circumferential confronting type motor. FIG. 12 is a cross-sectional view of a prior art that employs a thrust magnetic bearing mechanism in a circumferential confronting type pneumatic dynamic pressure bearing motor used in deflection scanning devices that use polygon mirrors.

The pneumatic dynamic pressure bearing motor shown in FIG. 12 comprises primarily of a rotor assembly 1 and a stator assembly 2. The rotor assembly 1 is equipped with a generally cylindrical-shaped rotor 10 with a shaft hole 13, and a drive magnet 11 mounted on an outer circumference side of the rotor 10 via a magnet yoke 12. In the meantime, the stator assembly 2 is equipped with a fixed shaft 20, whose one end section is fixed to a motor frame 21 and which is inserted in the shaft hole 13 of the rotor 10, and an armature core 22, which is indirectly supported by the motor frame 21 and has a drive coil 23 wound around it; where an outer circumference surface of the armature core 22 and an inner circumference surface of the drive magnet 11 oppose each other in the radial direction across a predetermined gap.

A dynamic pressure bearing mechanism 4 is formed between an outer circumference surface of the fixed shaft 20 and an inner circumference surface of the shaft hole 13 formed in the rotor 10, and two blocks of radial dynamic pressure bearing sections 41 and 42 that comprise the dynamic pressure bearing mechanism 4 are formed on at least one of the outer circumference surface of the fixed shaft 20 or the inner circumference surface of the shaft hole 13. When a predetermined amount of current is supplied to the drive coil 23, electromagnetic action between the armature core 22 and the drive magnet 11 causes an optical deflecting polygon mirror 6 mounted on the rotor 10 to rotate, and an incoming laser beam is reflected off of the polygon mirror 6 and is deflection-scanned in a predetermined direction.

In the pneumatic dynamic pressure bearing motor having such a structure, a concave section 24 is formed at the tip section of the fixed shaft 20, and a ring-shaped fixed-side thrust magnet 31 is provided in the concave section 24. A rotation-side thrust magnet 32 is provided more interior in the radial direction than the fixed-side thrust magnet 31 in a manner confronted with the fixed-side thrust magnet 31. The fixed-side thrust magnet 31 and the rotation-side thrust magnet 32 are positioned so that their respective poles are placed opposite to the opposing poles of the other thrust magnet, and together they make up a thrust magnetic bearing mechanism 3. The magnetic attractive force or the magnetic repulsive force that is generated between the two thrust magnets 31 and 32 restrains the oscillation of the rotor 10 in the thrust direction.

However, in such a pneumatic dynamic pressure bearing motor, dust such as magnetic particles and/or dust generated by abrasion is sometimes attached, although in extremely minuscule amounts, to the surfaces of the thrust magnets 31 and 32, due to the fact that the fixed-side thrust magnet 31 and the rotation-side thrust magnet 32 are formed by mixing and kneading magnetic particles and a binder and by using such methods as compress molding or sintering. The dust is then carried by the air current inside the motor and moves into the dynamic pressure bearing mechanism 4, which is formed between the outer circumference surface of the fixed shaft 20 and the inner circumference surface of the shaft hole 13. Since the dynamic pressure bearing mechanism 4 normally has a bearing gap of several micrometers, once dust enters the bearing gap, so-called bums occur in the dynamic pressure bearing mechanism 4, which can lead to problems in the bearing life and cause major problems such as the motor failing to rotate.

This problem is not limited to motors that use pneumatic dynamic pressure bearings, and can equally occur in motors that use bearings in which the bearing and the shaft are supported in a relatively rotatable manner across a minuscule gap, such as oil dynamic pressure bearings and oil-impregnated sintered bearings.

In this type of motor, the thrust bearing mechanism 3 is provided to restrain the oscillation of the rotor 10 in the thrust direction, and rare earth magnets are normally used as the thrust magnets 31 and 32, since they require large magnetic attractive force in spite of their relatively small volumes. This can consequently lead to escalating parts cost, which then makes the entire motor expensive.

SUMMARY OF THE INVENTION

In view of the problems described above, the present invention provides an inexpensive circumferential confronting type motor that can reduce both the parts cost and the motor price by improving the structure of the thrust bearing mechanism such that an independent thrust bearing mechanism that supports the rotor can be eliminated. The present invention also provides a circumferential confronting type motor that can reduce the occurrence of bearing failures by preventing the dust that is generated in the thrust bearing mechanism from entering the bearing section.

In order to solve the above problems, a circumferential confronting type motor in accordance with an embodiment of the present invention comprises an armature core that has drive coils wound around its plurality of poles, and a drive magnet positioned opposite to the armature core in the radial direction, wherein the drive magnet has a plurality of divided magnetized sections, each with a magnetic center and formed separated from each other in the axial direction by a non-magnetized section. In one aspect, the magnetic centers of the respective plurality of divided magnetized sections are provided in symmetrical positions to a magnetic center in the axial direction of the armature core. Further, electromagnetic action between the drive magnet and the armature core causes the two to rotate relatively, while magnetic action between the plurality of divided magnetized sections and the armature core regulates their relative movements in the axial direction.

According to the present invention, due to the fact that the electromagnetic action to rotatively drive the rotor is generated by having the drive magnet and the armature core positioned opposite to each other, and to the fact that the oscillation of the rotor in the thrust direction is restrained by the magnetic action between the plurality of divided magnetized sections, which are formed separated in the axial direction, and the armature core, it is possible to eliminate an independent thrust bearing mechanism that independently supports the rotor in the thrust direction, and thereby reduce the parts cost and the motor price.

In the circumferential confronting type motor described above, it is preferable for the plurality of divided magnetized sections to be formed symmetrically to the magnetic center in the axial direction of the armature core.

With such a structure, since the divided magnetized sections are symmetrically shaped there is no change in the magnetic actions and effects, even when the posture of the drive magnet is inverted vertically. As a result, motor components can be shared, which can reduce the motor price even further.

Additionally, the drive magnet may comprise a first divided magnetized section and a second divided magnetized section that are provided separated in the axial direction by a non-magnetized section, and it is desirable for the direction of the attraction of the first divided magnetized section to the armature core and the direction of the attraction of the second divided magnetized section to the armature core to be in opposite directions.

According to such a structure, the drive magnet comprises two pieces, which is the minimum quantity required to achieve the purpose of the present invention, which are the first divided magnetized section and the second divided magnetizing section. Due to the fact that the attraction directions to the armature core are opposite for the two divided magnetized sections, the oscillation in the axial direction of the drive magnet and the armature core can be regulated relatively with a simple structure.

In addition, by forming the non-magnetized section with a non-magnetic material, i.e., non-magnetic materials such as resin, ceramic, non-magnetic metals, the interval between the divided magnetized sections can be maintained at a constant interval; and by forming the non-magnetized section with void space, the interval between the divided magnetized sections can be adjusted, so that optimum relative positions of the divided magnetized sections to restrain the oscillation of the rotor in the thrust direction can be obtained through such an adjustment.

Furthermore, by mounting the drive magnet on a circumference surface of a magnet yoke and by providing in the magnet yoke and abutting the end surface of the drive magnet a positioning section to position the drive magnet in the axial direction, the drive magnet can be positioned in the axial direction surely and accurately.

When the drive magnet and the armature core are arranged such that one is provided in a rotor assembly while the other is provided in a stator assembly, where the rotor assembly and the stator assembly are supported in a relatively rotatable manner by a radial bearing mechanism comprising a fluid dynamic pressure bearing or an oil-impregnated sintered bearing supported across a predetermined gap, the bearing can wear out or the rotor assembly can stop rotating suddenly when dust enters the gap in structures in which the stator assembly supports the rotor assembly across the predetermined gap, as in fluid dynamic bearings or oil-impregnated sintered bearings. However, according to the present invention, due to the fact that the radial bearing mechanism is provided more interior in the radial direction than the drive magnet, there is an extremely low risk of dust entering the gap, which can lengthen the life of the motor.

A circumferential confronting type motor according to the present invention comprises a rotor assembly with a ring-shaped drive magnet and a cylinder section in which a shaft hole is formed; a stator assembly with a fixed shaft that is inserted in the shaft hole and that supports the rotor assembly in a rotatable manner, and an armature core positioned opposite to the drive magnet in the radial direction; and a dynamic pressure bearing mechanism formed between an outer circumference surface of the fixed shaft and an inner circumference surface of the shaft hole, wherein the drive magnet has a plurality of divided magnetized sections, each with a magnetic center and formed separated from each other in the axial direction by a non-magnetized section. In one aspect, the magnetic centers of the respective plurality of divided magnetized sections are provided in symmetrical positions to a magnetic center in the axial direction of the armature core, and electromagnetic action between the drive magnet and the armature core causes the two to rotate relatively, while magnetic action between the plurality of divided magnetized sections and the armature core regulates the movement relatively in the axial direction of the rotor assembly.

According to the present invention, due to the fact that the electromagnetic action to rotatively drive is generated by having the drive magnet and the armature core positioned opposite to each other, and to the fact that the oscillation of the rotor in the thrust direction is restrained by the magnetic action between the plurality of divided magnetized sections and the armature core, it is possible to eliminate an independent thrust bearing mechanism that independently supports the rotor in the thrust direction, and thereby reduce parts cost and the motor price. In addition, dust attached to the drive magnet can be prevented from entering the dynamic pressure bearing mechanism, which makes it possible to sustain the bearing performance for a long time.

Other objects, features and advantages of the invention will become apparent from the following detailed description taken in conjunction with the accompanying drawings.

DESCRIPTION OF PREFERRED EMBODIMENTS

Figure 12:
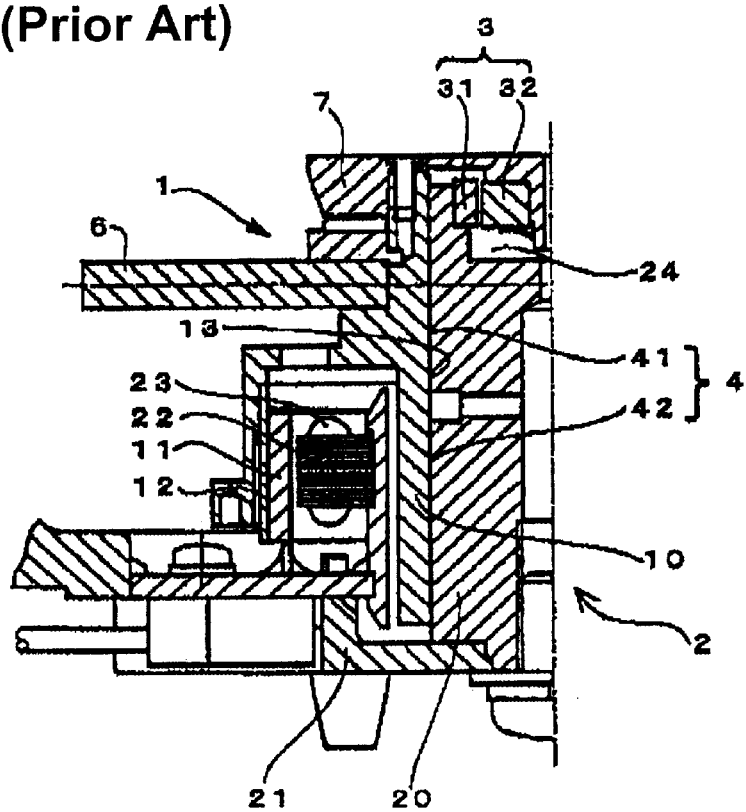
FIG. 12 is a cross-sectional view of a conventional circumferential confronting type pneumatic dynamic pressure bearing motor.

Embodiments of a circumferential confronting type motor according to the present invention are described below with references to drawings. Elements having the same function as those in the conventional mode shown in FIG. 12 are assigned the same numbers.

Embodiment 1

Figure 1:
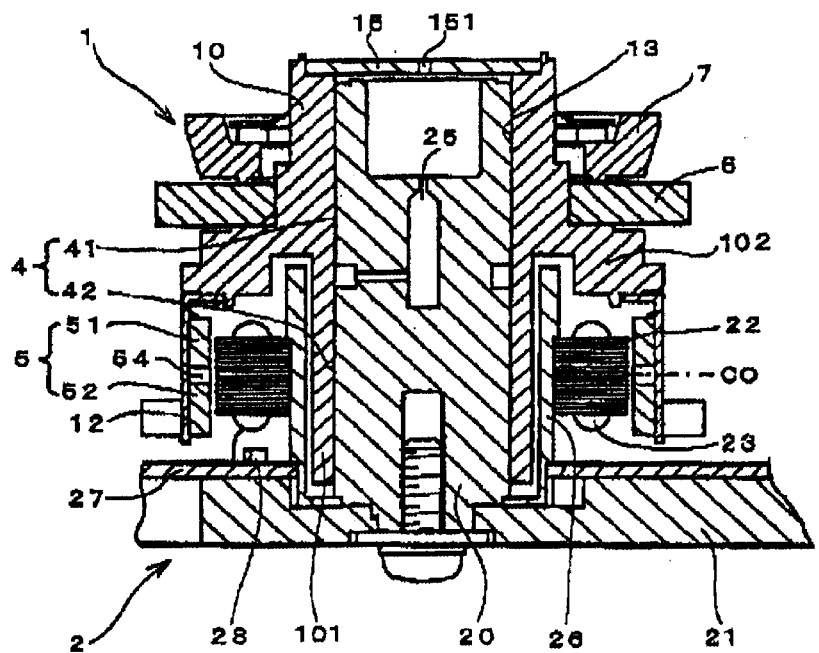
FIG. 1 is a longitudinal cross-sectional view a circumferential confronting type motor in accordance with a first embodiment of the present invention, which is implemented in a deflection scanning device.

FIG. 1 is a longitudinal cross-sectional view indicating the first embodiment in which a circumferential confronting type motor according to the present invention is applied to a deflection scanning device. The circumferential confronting type motor in FIG. 1 is primarily composed of a rotor assembly 1 and a stator assembly 2. The rotor assembly 1 is equipped with a generally cylindrically-shaped rotor 10, a drive magnet 5 mounted on an outer circumference side of the rotor 10 via a magnet yoke 12, and a polygon mirror 6 fixed to the rotor 10.

The rotor 10 has a cylinder section 101 in which a shaft hole 13 is formed, and a fixed shaft 20 is inserted in the shaft hole 13. An abrasion-resistant film made of electroless nickel plating or hard Alumite film is provided on an inner circumference surface of the shaft hole 13, while on an outer circumference surface of the fixed shaft 20 herringbone-shaped dynamic pressure generating grooves, as well as a lubricating resin film, are formed. As a result, a dynamic pressure bearing mechanism 4 is formed between the inner circumference surface of the shaft hole 13 and the outer circumference surface of the fixed shaft 20. The dynamic pressure bearing mechanism 4 is equipped with radial dynamic pressure bearing sections 41 and 42, which are divided into two blocks.

Inside of the fixed shaft 20 is an air supply hole 25, which opens at the tip section (towards the top in the FIG.) of the fixed shaft 20 and which extends in the axial direction; the air supply hole 25 opens to the outside of the fixed shaft 20 in the middle section between the radial dynamic pressure bearing sections 41 and 42 that are divided into two blocks. When the rotor 10 rotates, air is delivered between the pair of radial dynamic pressure bearing sections 41 and 42 through a small hole 151 of a cover member 15 provided at one of the opening sections of the rotor 10 and through the air supply hole 25, and the air is discharged to the outside as it is carried to the outside in the axial direction (vertical direction in the drawing) by the pumping effect of the dynamic pressure generating grooves.

In the present embodiment, the maximum dynamic pressure generating sections are positioned in the vicinity of both ends in the axial direction of each of the radial dynamic pressure bearing sections 41 and 42. During rotation, the rotor 10 can be rotated without any resistance due to the dynamic pressure generated across a bearing gap of several micrometers to dozens of micrometers. A part of the air discharged outside of the bearing is recirculated so that it flows again through the air supply hole 25 and into the dynamic pressure bearing mechanism 4.

On a lateral outer circumference section of the cylinder section 101 of the rotor 10 is provided in a unitary fashion a flange section 102, which is in a down-facing cup shape, and on an inner circumference wall surface of the flange section 102 is fixed the drive magnet 5, which has a plurality (two in this embodiment) of divided magnetized sections 51 and 52, via the magnet yoke 12. The structure of the drive magnet 5 will be described in greater detail below.

An armature core 22, having a plurality of poles each with a drive coil 23 wound around, is positioned more interior in the radial direction than the drive magnet 5 in a manner opposite to the drive magnet 5 across a predetermined gap. Consequently, when a current is provided to the drive coils 23, electromagnetic action generated between the armature core 22 and the drive magnet 5 causes the rotor 10 to rotate, and the polygon mirror 6 fixed to the rotor 10 can be rotatively driven.

In the meantime, the stator assembly 2 is equipped with a fixed shaft 20, which is made of aluminum alloy and, with its one end section fixed to a motor frame 21, inserted in the shaft hole 13 of the rotor 10; a generally cylindrically-shaped core holder 26 fixed to the motor frame 21; the armature core 22 mounted on an outer circumference side of the core holder 26; and the drive coils 23, one wound around each pole of the armature core 22. The armature core 22 is a laminate of a plurality of magnetic plates of identical thickness and has a magnetic center C0 at the midpoint in the axial direction. A motor substrate 27 is placed on top of the motor frame 21, and on the top surface section of the motor substrate 27 are mounted electronic components 28 that comprise a motor drive circuit.

Figure 2:
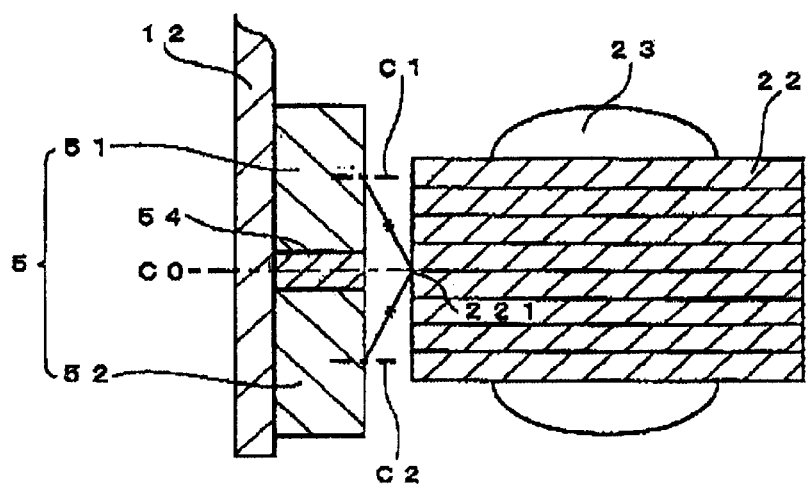
FIG. 2 is an enlarged view of key parts of the first embodiment.

In the deflection scanning device equipped with the circumferential confronting type motor according to the first embodiment, the drive magnet 5, as shown enlarged in FIG. 2, comprises the first divided magnetized section 51 and the second divided magnetized section 52 that are formed separated in the axial direction by a resin spacer 54, which is a non-magnetized section. The divided magnetized sections 51 and 52 have a magnetic center C1 and a magnetic center C2, respectively, formed at positions symmetrical to the magnetic center C0 in the axial direction of the armature core 22. The first divided magnetized section 51 and the second divided magnetized section 52 have the same thickness and shape, and the distance from an outer most circumference position 221 of the magnetic center C0 of the armature core 22 to the magnetic center C1 of the first divided magnetized section 51 and that to the magnetic center C2 of the second divided magnetized section 52 are equal.

Figure 3:
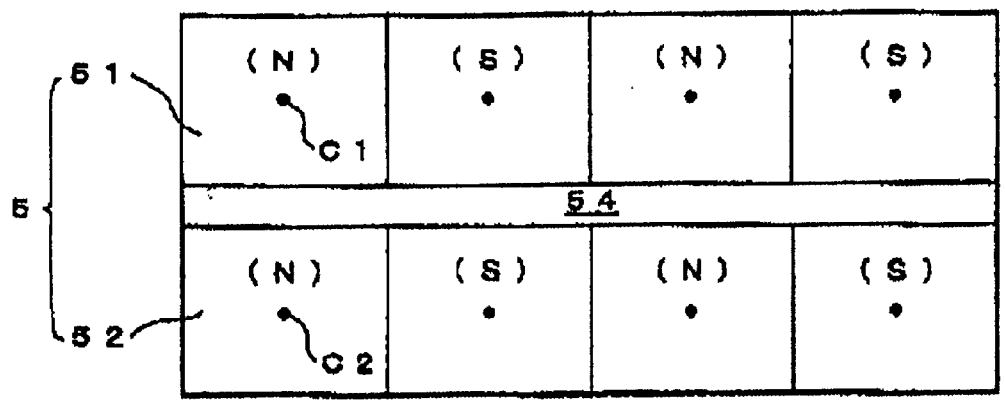
FIG. 3 is a developed view indicating the magnetized condition of a drive magnet in the first embodiment.

FIG. 3 is a developed view of the ring-shaped drive magnet 5 indicated flat in order to describe the magnetized condition of the drive magnet 5 in the first embodiment. As FIG. 3 indicates, at the center in the axial direction (vertical direction in the drawing) of the drive magnet 5 is formed the non-magnetized section 54 in a uniform width and along the entire circumference. The non-magnetized section 54 is a part that is located opposite to the magnetic center C0 of the armature core 22 when the drive magnet 5 is positioned opposite the armature core 22. And magnetized on either side vertically of the non-magnetized section 54 are four poles each of north poles and south poles in a uniform pitch in the circumferential direction (horizontal direction in the drawing) for a total of eight magnetic poles. The first divided magnetized section 51 and the second divided magnetized section 52 are formed symmetrically across the non-magnetized section 54.

In the present embodiment, a resin spacer is used as the non-magnetized section 54, but it can be made of other non-magnetic materials such as aluminum, copper or ceramic. Alternatively, the drive magnet 5 can be provided in the following manner. After molding a drive magnet member for the driver magnet 5 with magnetic particles and a binder, a magnetizing head is adhered to or placed in close proximity to regions to be magnetized of the drive magnet member which are separated from one another in the axial direction to magnetize the regions to form the first and second divided magnetized sections 51 and 52 while leaving a non-magnetized band between the divided magnetized sections 51 and 52 for the non-magnetized section 54.

When the drive magnet 5 as described above is positioned opposite to the armature core 22 and a predetermined amount of current is provided to the drive coils 23 wound around the armature core 22, electromagnetic action is generated across the drive magnet 5 and the armature core 22, which causes the drive magnet 5 on the rotor side to be rotatively driven. Further, due to the fact that the magnetic center C1 of the first divided magnetizing section 51 and the magnetic center C2 of the second divided magnetized section 52 are provided at positions symmetrical to the magnetic center C0 in the axial direction of the armature core 22, the attractive force between the armature core 22 and the first divided magnetized section 51 and the attractive force between the armature core 22 and the second divided magnetized section 52 work in opposite directions, and magnetic action that tries to maintain equilibrium at all times comes into effect. Consequently, the drive magnet 5 and the armature core 22 use this magnetic action to regulate movement relatively in the axial direction, which restrains the oscillation of the rotating rotor assembly 1. Furthermore, due to the fact that, with this structure, the rotor is not supported by an independent thrust bearing mechanism as in the prior art, the parts cost and the motor price can be reduced.

Moreover, in the circumferential confronting type motor in FIG. 1, dynamic pressure is generated in the air by the pumping effect of the radial dynamic pressure bearing sections 41 and 42, and the pneumatic dynamic pressure bearing mechanism 4 that is provided supports the rotor assembly 1 with the dynamic pressure; and the bearing gap of several micrometers to dozens of micrometers is formed between the inner circumference surface of the shaft hole 13 and the outer circumference of the fixed shaft 20 that make up the dynamic pressure bearing mechanism 4. In accordance with the present invention, due to the fact that the dynamic pressure bearing mechanism 4 is provided to the interior in the radial direction of the position of the drive magnet 5 and connected to the drive magnet 5 via the core holder 26 and the cylinder section 101, there is an extremely low risk of dust entering the bearing gap, which prevents sudden stops and bearing wear to make the motor last longer.

In addition, in the deflection scanning device in which the polygon mirror 6 is mounted on the rotor 10, a high precision deflection scanning can be performed.

Embodiment 2

Figure 4:
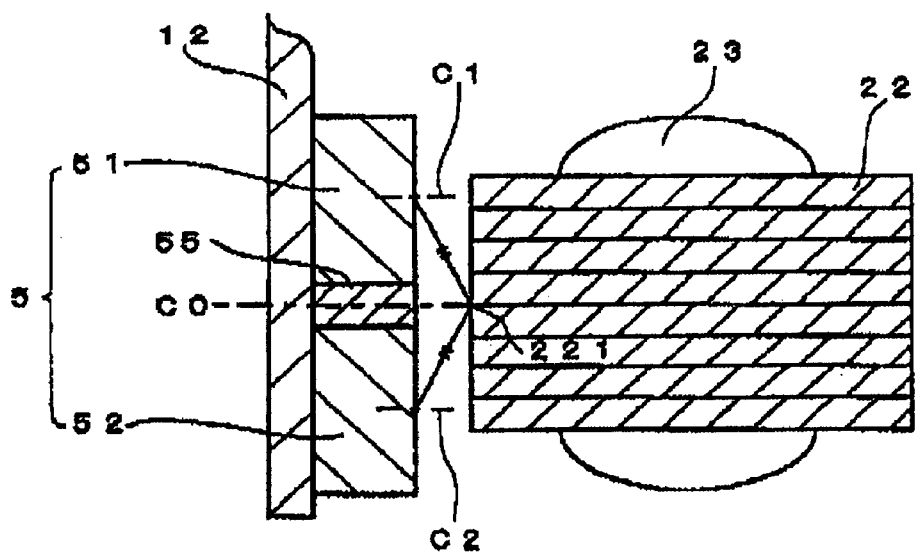
FIG. 4 is a cross-sectional view of key parts of a circumferential confronting type motor in accordance with a second embodiment of the present invention.
Figure 5:
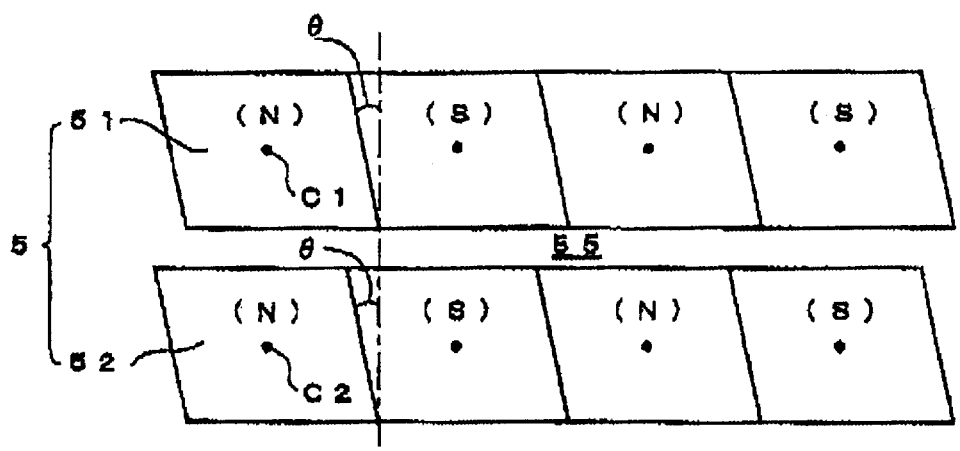
FIG. 5 is a developed view indicating the magnetized condition of a drive magnet in the second embodiment.

FIGS. 4 and 5 show another embodiment of a circumferential confronting type motor in accordance with the present invention. FIG. 4 is a cross-sectional view of key parts of the circumferential confronting type motor, and FIG. 5 is a developed view of a drive magnet 5. Elements identical to those in the first embodiment are assigned the same numbers and duplicate descriptions are omitted.

In FIG. 4, a drive magnet 5 is equipped with a first divided magnetized section 51 and a second divided magnetized section 52, and the divided magnetized sections are structured as magnets independent from one another across a non-magnetized section 55, which is a void space. The divided magnetized sections 51 and 52 have a magnetic center C1 and a magnetic center C2, respectively, formed at positions symmetrical to a magnetic center C0 in the axial direction of an armature core 22, and the first divided magnetized section 51 and the second divided magnetized section 52 have the same thickness and shape. In addition, the distance from an outer most circumference position 221 of the magnetic center C0 of the armature core 22 to the magnetic center C1 of the first divided magnetized section 51 and that to the magnetic center C2 of the second divided magnetized section 52 are equal.

The magnetized conditions of the first divided magnetized section 51 and the second divided magnetized section 52 are such that they are magnetized with the boundary lines between adjacent magnetic poles inclined at a predetermined skew angle θ to the axial direction (vertical direction in the drawing). Further, the magnetic center C1 of the first divided magnetized section 51 and the magnetic center C2 of the second divided magnetized section 52 are positioned to be on the same line in the axial direction. The skew angle θ may preferably be set between about 10° and 30°.

In the second embodiment in which the drive magnet 5 is structured by fixing to a magnet yoke 12 the first divided magnetized section 51 and the second divided magnetized section 52 across the void space 55 as the non-magnetized section, the interval between the divided magnetized sections 51 and 52 can be adjusted, and the optimum relative positions of the divided magnetized sections 51 and 52 to restrain the oscillation of a rotor assembly 1 in the thrust direction can be obtained through such an adjustment. Further, due to the fact that the first divided magnetized section 51 and the second divided magnetized section 52 are magnets having an identical shape, parts can be shared, which can reduce the parts cost. Moreover, by magnetizing the first and second divided magnetized sections 51 and 52 at a skewed angle, cogging torque is reduced, so that the rotor assembly 1 can be rotatively driven smoothly.

In structuring the drive magnet 5 by attaching to the magnet yoke 12 the first divided magnetized section 51 and the second divided magnetized section 52 across the void space 55, the skew angle θ is not necessarily a requirement for the first and second divided magnetized sections 51 and 52, so that the boundary lines between adjacent magnetic poles can be parallel to the axial direction, as shown in FIG. 3. Or, a drive magnet 5 with a predetermined skew angle 0 for each magnetic pole as shown in FIG. 5 can be applied to the first embodiment.

Embodiment 3

Figure 6:
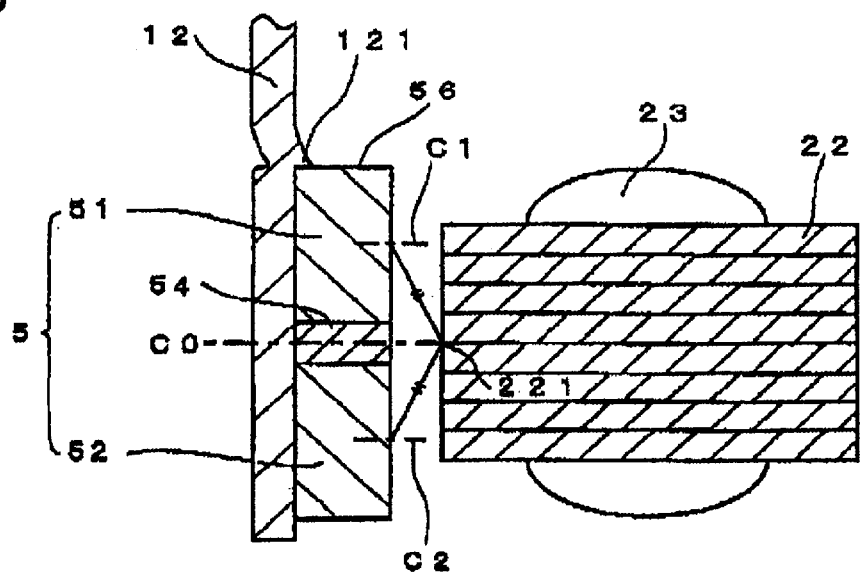
FIG. 6 is a cross-sectional view of key parts of a circumferential confronting type motor in accordance with a third embodiment of the present invention.

FIG. 6 is a cross-sectional view of key parts of a circumferential confronting type motor in accordance with another embodiment of the present invention. Elements identical to those in the first embodiment are assigned the same numbers and duplicate descriptions are omitted.

In FIG. 6, a drive magnet 5 is mounted on an inner circumference surface of a magnet yoke 12, which has a positioning section 121 that abuts against an end surface 56 of the drive magnet 5 and positions the drive magnet 5 in the axial direction. The positioning section 121 can be easily formed by using a punch from an outer circumference side to an inner circumference side of the magnetic yoke 12, which is made of a magnetic metal, to cause a plastic deformation that protrudes inward in the radial direction. The positioning section 121 can be formed along the entire circumference at the same height in the axial direction of the magnet yoke 12, or it can be formed in a plurality of positions at an interval in the circumferential direction.

According to the third embodiment, due to the fact that the positioning section 121 that positions the drive magnet 5 in the axial direction is provided in the magnet yoke 12, the positioning of the drive magnet 5 in the axial direction can be reliably conducted. As a result, the relative positions of magnetic centers C1 and C2 of first and second divided magnetized sections 51 and 52, respectively, which comprise the drive magnet 5, and a magnetic center C0 of an armature core 22 can be accurately established.

Embodiment 4

Figure 7:
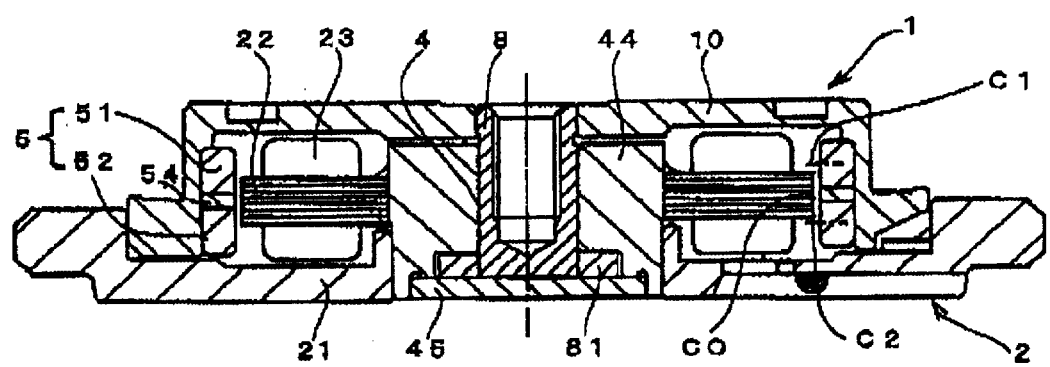
FIG. 7 is a longitudinal cross-sectional view of a circumferential confronting type motor in accordance with a fourth embodiment of the present invention, which is implemented in a magnetic disk drive device.

FIG. 7 is a longitudinal cross-sectional view of the fourth embodiment, in which a circumferential confronting type motor according to the present invention is applied to a magnetic disk drive device. Elements identical to those in the first embodiment are assigned the same numbers and duplicate descriptions are omitted.

In FIG. 7, a cylindrically-shaped bearing sleeve 44 is supported in a center section of a motor frame 21, and one end section of the bearing sleeve 44 is closed off by a cover member 45. A rotary shaft 8 is inserted in a shaft hole of the bearing sleeve 44, and while a cup-shaped rotor 10 is fixed to one end side of the rotary shaft 8, a fall-out stopper member 81 is fitted and fixed to the other end side. A dynamic pressure bearing mechanism 4, which has dynamic pressure generating grooves omitted from the drawings, is formed in the gap between an outer circumference, surface of the rotary shaft 8 and an inner circumference surface of the bearing sleeve 44, and a lubricating fluid such as oil is filled in the gap. An armature core 22 is mounted on an outer circumference of the bearing sleeve 44, and a drive coil 23 is wound around each of the poles of the armature core 22. A drive magnet 5, which is fixed to an inner circumference of the rotor 10, is provided in a position opposite to an outer circumference surface of the armature core 22.

In the fourth embodiment, the drive magnet 5 comprises a first divided magnetized section 51 and a second divided magnetized section 52 that are separated in the axial direction by a non-magnetized section 54, as in the first embodiment. The divided magnetized sections 51 and 52 have a magnetic center C1 and a magnetic center C2, respectively, formed at positions symmetrical to a magnetic center C0 in the axial direction of the armature core 22. The first divided magnetized section 51 and the second divided magnetized section 52 have the same thickness and shape, and the distance from an outer most circumference position of the magnetic center C0 of the armature core 22 to the magnetic center C1 of the first divided magnetized section 51 and that to the magnetic center C2 of the second divided magnetized section 52 are equal.

According to the fourth embodiment, electromagnetic action between the drive magnet 5 and the armature core 22 causes a rotor assembly 1 and a stator assembly 2 to rotate relatively, while at the same time magnetic action between the drive magnet 5 and the armature core 22 regulates the movement relatively in the axial direction, which restrains the oscillation of the rotating rotor assembly 1. Furthermore, due to the fact that with this structure can eliminate an independent thrust bearing mechanism that supports the rotor in the thrust direction as in the prior art, the parts cost and the motor price can be reduced.

In addition, the circumferential confronting type motor shown in FIG. 7 has the fluid dynamic pressure bearing mechanism 4 that supports the rotor in a freely rotatable manner. Due to the fact that the dynamic pressure bearing mechanism 4 in the present invention is provided to the interior in the radial direction of the position of the drive magnet 5, i.e., at the inner most circumference part of the motor, there is an extremely low risk of dust entering the bearing gap, which prevents sudden stops and bearing wear to make the motor last longer.

Embodiment 5

Figure 8:
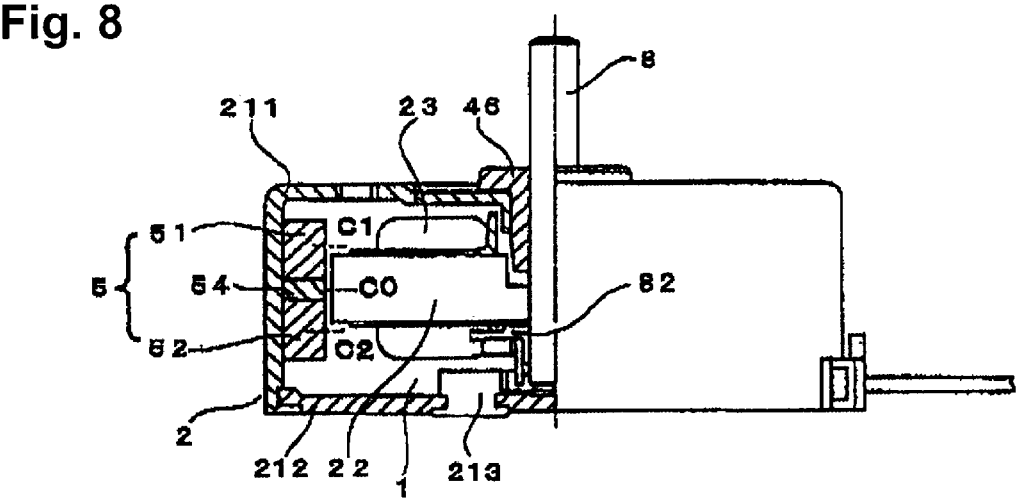
FIG. 8 is a longitudinal cross-sectional view of a circumferential confronting type motor in accordance with a fourth embodiment of the present invention, which is implemented in an inner rotor-type motor with brush.

FIG. 8 is a longitudinal cross-sectional view of a fifth embodiment, in which a circumferential confronting type motor according to the present invention is applied to an inner rotor-type motor with brush. Elements identical to those in the first embodiment are assigned the same numbers and duplicate descriptions are omitted.

In FIG. 8, a stator assembly 2 comprises a motor case 211, which is in a cup shape with bottom, a drive magnet 5 fixed to an inner circumference surface of the motor case 211, an oil-impregnated sintered bearing 46 attached at the center of the bottom section of the motor case 211, a cover member 212 that closes an opening section of the motor case 211, and a brush unit 213 provided on the cover member 212. In the meantime, a rotor assembly 1 comprises a rotary shaft 8 inserted in the oil-impregnated sintered bearing 46, an armature core 22 mounted at the center section of the rotary shaft 8, a drive coil 23 wound around each of the poles of the armature core 22, and a commutator unit 82 mounted on one end of the rotary shaft 8. When a predetermined amount of current is provided to the drive coil 23 via the brush unit 121 and the commutator unit 82, electromagnetic action between the armature core 22 and the drive magnet 5 causes the rotor assembly 1 to rotate as it is supported by the oil-impregnated sintered bearing 46.

In the fifth embodiment, the drive magnet 5 comprises a first divided magnetized section 51 and a second divided magnetized section 52 that are formed separated in the axial direction by a non-magnetized section 54. The divided magnetized sections 51 and 52 have a magnetic center C1 and a magnetic center C2, respectively, formed at positions symmetrical to a magnetic center C0 in the axial direction of the armature core 22. The first divided magnetized section 51 and the second divided magnetized section 52 have the same thickness and shape, and the distance from an outer most circumference position of the magnetic center C0 of the armature core 22 to the magnetic center C1 of the first divided magnetized section 51 and that to the magnetic center C2 of the second divided magnetized section 52 are equal.

In the first embodiment, the circumferential confronting type motor described was an outer rotor type, in which the armature core 22 is fixed and the drive magnet 5 positioned opposite to the outer circumference of the armature core 22 rotates. In contrast, in the fifth embodiment, the circumferential confronting type motor is an inner rotor type, in which it is the armature core 22 positioned opposite to the inner circumference surface of the drive magnet 5, which is the fixed element, that rotates.

Even in the fifth embodiment described above, as in the first embodiment, due to the fact that the electromagnetic action for rotationally driving of the rotor is generated by having the drive magnet 5 and the armature core 22 positioned opposite each other, and to the fact that the oscillation of the rotor assembly 1 in the thrust direction is restrained by the magnetic action between the plurality of divided magnetized sections 51 and 52, which are formed separated in the axial direction, and the armature core 22, it is possible to eliminate an independent thrust bearing mechanism that independently supports the rotor in the thrust direction, and thereby reduce the parts cost and the motor price.

The invention by the inventors has been described in detail based on the embodiments, but needless to say, many modifications can be made without departing from the present invention.

Figure 9:
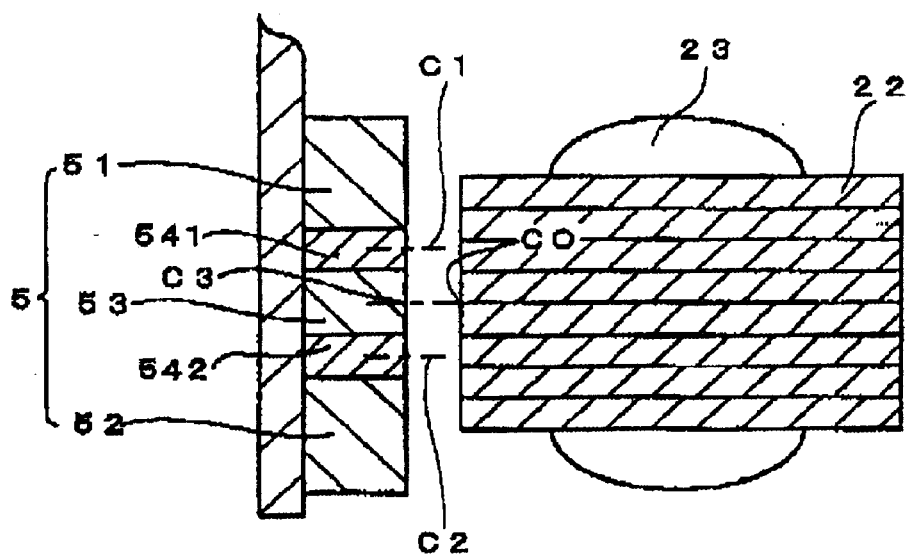
FIG. 9 is a cross-sectional view of another embodiment in accordance with the present invention.

For example, in the first through fifth embodiments described above, the examples relate to a structure in which the drive magnet 5 comprises the divided magnetized sections 51 and 52 that are formed separated in two in the axial direction by the non-magnetized section 54 (55), wherein the divided magnetized sections 51 and 52 have the magnetic center C1 and the magnetic center C2, respectively, formed at positions symmetrical to the magnetic center C0 in the axial direction of the armature core 22. However, as shown in FIG. 9, a drive magnet 5 can be formed from three divided magnetized sections 51, 52 and 53 separated from one another in the axial direction, wherein the adjacent divided magnetized sections are separated by two non-magnetized sections 541 and 542. In this case, the divided magnetized sections 51 and 52, which are at either end in the axial direction, have their respective magnetic centers C1 and C2 equidistant from a magnetic center C0 in the axial direction of an armature core 22. The third divided magnetized section 53, which is positioned in the center, has a magnetic center C3 at the same level in the axial direction as the magnetic center C0 of the armature core 22. For this reason, the third divided magnetized section 53 does not contribute to restraining the oscillation of a rotor assembly 1 in the thrust direction, but it does contribute significantly to rotational driving of the rotor assembly 1. When providing a plurality of non-magnetized sections 541 and 542 as shown in FIG. 9, it is preferable to use tangible non-magnetized sections made of resin or non-magnetic metals, so that each divided magnetized section can be placed at its predetermined position.

Figure 10:
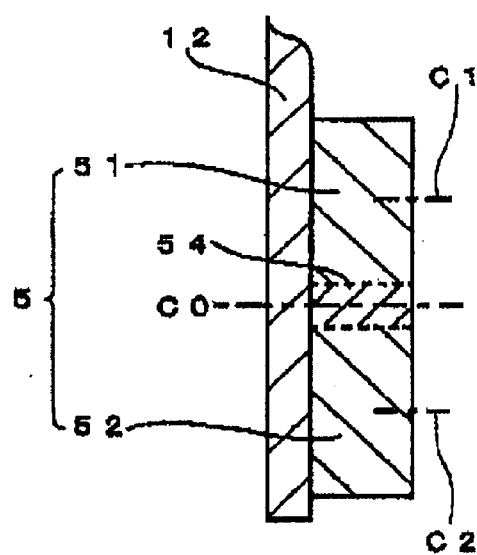
FIG. 10 is a cross-sectional view of yet another embodiment in accordance with the present invention.

Alternatively, a non-magnetized section 54 can be formed by not mixing magnetic particles in the center section in the axial direction of a single drive magnet 5, so that two divided magnetized sections 51 and 52 can be provided at either side in the axial direction of the non-magnetized section 54, as shown in FIG. 10.

Figure 11:
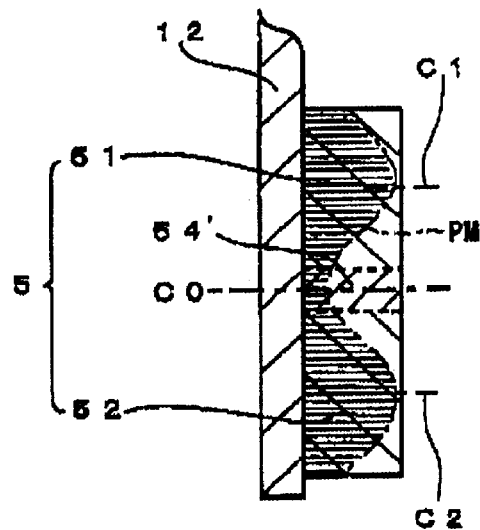
FIG. 11 is a cross-sectional view of still another embodiment in accordance with the present invention.

Furthermore, as shown in FIG. 11, the orientation rate distribution PM of magnetic particles in a single drive magnet 5 can be arranged so that the orientation rate is minimal in the center part in the axial direction, while it is maximal on either side in the axial direction of the center part where the orientation rate is minimal. By magnetizing in this state, a weakly magnetized section 54' can be formed in the center part in the axial direction, while two divided magnetized sections 51 and 52 are formed on either side in the axial direction of the weakly magnetized section 54'.

As described above, according to the present invention, a drive magnet is formed from a plurality of divided magnetized sections formed separated and in symmetrical positions to a magnetic center of an armature core such that electromagnetic action between the drive magnet and the armature core causes both to rotate relatively, while magnetic action between the plurality of divided magnetized sections and the armature core regulates movement relatively in the axial direction. Consequently, due to the fact that the electromagnetic action to rotatively drive the rotor section is generated by having the drive magnet and the armature core positioned opposite to each other, and to the fact that the oscillation of a rotor in the thrust direction is restrained by the magnetic action between the plurality of divided magnetized sections, which are formed separated from one another in the axial direction, and the armature core, an independent thrust bearing mechanism structure that supports the rotor in the thrust direction independently of the radial bearing can be eliminated, and thereby reduce the parts cost and the motor price.

Further, when the present invention is applied to a circumferential confronting type motor with a fluid dynamic pressure bearing or an oil-impregnated sintered bearing in which a stator assembly supports a rotor assembly across a predetermined gap, due to the fact that a radial bearing mechanism is provided more interior in the radial direction than the drive magnet, there is an extremely low risk of dust entering the bearing gap, which can prevent the bearing from wearing out or the rotor assembly from suddenly stopping and can therefore lengthen the life of the motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A circumferential confronting type motor comprising:
   an armature core having a plurality of poles, each of the poles having a drive coil; and
   a drive magnet positioned opposite to the armature core in a radial direction, the drive magnet having a plurality of divided magnetized sections separated from one another in an axial direction by a weaker-magnetized section, each of the divided magnetized sections having a magnetic center, wherein the magnetic centers of the divided magnetized sections are positioned symmetrical with respect to a magnetic center in the axial direction of the armature core.

2. A circumferential confronting type motor according to claim 1, wherein electromagnetic action between the drive magnet and the armature core causes the drive magnet and the armature core to rotate relatively, while electromagnetic action between the plurality of divided magnetized sections and the armature core restricts relative movements in the axial direction between the drive magnet and the armature core.

3. A circumferential confronting type motor according to claim 1, wherein the weaker-magnetized section is a non-magnetized section.

4. A circumferential confronting type motor according to claim 3, wherein the non-magnetized section is formed from a non-magnetic material.

5. A circumferential confronting type motor according to claim 3, wherein the non-magnetized section is formed from a void space.

6. A circumferential confronting type motor according to claim 1, wherein the plurality of divided magnetized sections has a specified magnetic force and the weaker-magnetized section has a magnetic force lower than the specified magnetic force of the plurality of divided magnetized sections.

7. A circumferential confronting type motor according to claim 1, wherein the plurality of divided magnetized sections have symmetrical configurations with respect to the magnetic center in the axial direction of the armature core.

8. A circumferential confronting type motor according to claim 7, wherein the plurality of divided magnetized sections include a first divided magnetized section and a second divided magnetized section that are separated from one another in the axial direction by the weaker-magnetized section, wherein a direction of attraction of the first divided magnetized section to the armature core and a direction of attraction of the second divided magnetized section to the armature core are mutually in opposite directions.

9. A circumferential confronting type motor according to claim 1, wherein the drive magnet is mounted on a circumference surface of a magnet yoke, the magnet yoke having a positioning section for abutting against an end surface of the drive magnet to position the drive magnet in the axial direction with respect to the armature core.

10. A circumferential confronting type motor according to claim 1, further comprising a radial bearing mechanism, wherein one of the drive magnet and the armature core is provided in a rotor assembly while the other is provided in a stator assembly, wherein the rotor assembly and the stator assembly are supported across a predetermined gap in a relatively rotatable manner by the radial bearing mechanism.

11. A circumferential confronting type motor according to claim 10, wherein the radial bearing mechanism is provided more interior in the radial direction than the drive magnet.

12. A circumferential confronting type motor according to claim 10, wherein the radial bearing mechanism is a fluid dynamic pressure bearing.

13. A circumferential confronting type motor according to claim 10, wherein the radial bearing mechanism is an oil-impregnated sintered bearing.

14. A circumferential confronting type motor comprising:
a rotor assembly with a ring-shaped drive magnet and a cylinder section in which a shaft hole is formed;
a stator assembly with a fixed shaft that is inserted in the shaft hole and that supports the rotor assembly in a rotatable manner, and an armature core positioned opposite to the drive magnet in the radial direction; and
a dynamic pressure bearing mechanism formed between an outer circumference surface of the fixed shaft and an inner circumference surface of the shaft hole, the drive magnet having a plurality of divided magnetized sections, each having a magnetic center, formed separated from one another in the axial direction by a weaker-magnetized section, wherein the magnetic centers of the respective plurality of divided magnetized sections are provided in symmetrical positions to a magnetic center in the axial direction of the armature core.

15. A circumferential confronting type motor according to claim 14, wherein the weaker-magnetized section is a non-magnetized section.

16. A circumferential confronting type motor according to claim 15, wherein the non-magnetized section is formed from a non-magnetic material.

17. A circumferential confronting type motor according to claim 15, wherein the non-magnetized section is formed from a void space.

18. A circumferential confronting type motor according to claim 14, wherein the plurality of divided magnetized sections has a specified magnetic force and the weaker-magnetized section has a magnetic force lower than the specified magnetic force of the plurality of divided magnetized sections.

19. A circumferential confronting type motor according to claim 14, wherein the plurality of divided magnetized sections have symmetrical configurations with respect to the magnetic center in the axial direction of the armature core.

20. A circumferential confronting type motor according to claim 19, wherein the plurality of divided magnetized sections include a first divided magnetized section and a second divided magnetized section that are separated from one another in the axial direction by the weaker-magnetized section, wherein a direction of attraction of the first divided magnetized section to the armature core and a direction of attraction of the second divided magnetized section to the armature core are mutually in opposite directions such that electromagnetic action between the first divided magnetized section and the armature core and electromagnetic action between the second divided magnetized section and the armature core restricts relative movements in the axial direction between the drive magnet and the armature core.

* * * * *